US011993383B2

(12) United States Patent
Woodington et al.

(10) Patent No.: US 11,993,383 B2
(45) Date of Patent: May 28, 2024

(54) AIRCRAFT CABIN

(71) Applicant: Safran Seats GB Limited, Cwmbran (GB)

(72) Inventors: James Woodington, Cwmbran (GB); Paul Wills, Cwmbran (GB); Oscar Ruiz, Cwmbran (GB); Arthur Glain, Cwmbran (GB); Matthew Cleary, Cwmbran (GB); Victor Carlioz, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 452 days.

(21) Appl. No.: 17/280,610

(22) PCT Filed: Sep. 25, 2019

(86) PCT No.: PCT/GB2019/052702
§ 371 (c)(1),
(2) Date: Mar. 26, 2021

(87) PCT Pub. No.: WO2020/065308
PCT Pub. Date: Apr. 2, 2020

(65) Prior Publication Data
US 2021/0347483 A1 Nov. 11, 2021

(30) Foreign Application Priority Data
Sep. 26, 2018 (GB) ..................... 1815702

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0605* (2014.12);
(Continued)

(58) Field of Classification Search
CPC ............ B64D 11/0601; B64D 11/0015; B64D 11/0602; B64D 11/0606; B64D 11/0607; B64D 11/064; B64D 11/0605
See application file for complete search history.

(56) References Cited

U.S. PATENT DOCUMENTS 11,679,881 B2 * 6/2023 White ............... B64D 11/0605
244/118.6
2005/0001097 A1 * 1/2005 Saint-Jalmes .......... B64D 11/00
244/118.6
(Continued)

FOREIGN PATENT DOCUMENTS

CN 108382600 A 8/2018
EP 0850834 A1 7/1998
(Continued)

OTHER PUBLICATIONS

International Patent Application No. PCT/GB2019/052702, International Search Report and Written Opinion, dated Jan. 22, 2020.
(Continued)

*Primary Examiner* — Philip J Bonzell
*Assistant Examiner* — Cindi M Curry
(74) *Attorney, Agent, or Firm* — Kilpatrick Townsend & Stockton LLP

(57) ABSTRACT

An aircraft cabin is provided. The aircraft cabin comprises a first row of seat units extending across the cabin between a first outboard sidewall of the cabin and a second opposite outboard sidewall of the cabin, a first aisle extending along the cabin, and a second aisle extending along the cabin. The first row of seats units comprises a first seat unit, a second seat unit, a third seat unit and no further seat units. The first aisle is positioned adjacent the first outboard sidewall and separates the first outboard sidewall and the first seat unit, the second seat unit is positioned adjacent the first seat unit, and the third seat unit is spaced apart from the second seat unit by the second aisle, the third seat unit being positioned adjacent the second outboard sidewall. The first row of seat units further comprises a privacy screen movable between a stowed position and a deployed position in which the privacy screen provides a barrier at least partially partitioning the first seat unit and second seat unit.

19 Claims, 5 Drawing Sheets

(52) U.S. Cl.
CPC ...... *B64D 11/0606* (2014.12); *B64D 11/0607* (2014.12); *B64D 11/064* (2014.12); *B64D 2011/0046* (2013.01)

(56) References Cited

U.S. PATENT DOCUMENTS

| | | |
|---|---|---|
| 2007/0170310 A1 | 7/2007 | Bock et al. |
| 2010/0187357 A1 | 7/2010 | Funke et al. |
| 2013/0105627 A1 | 5/2013 | Orson et al. |
| 2014/0361585 A1 | 12/2014 | Henshaw |
| 2016/0297524 A1 | 10/2016 | Simeon et al. |
| 2017/0240283 A1* | 8/2017 | Dowty ............... B64D 11/0604 |
| 2019/0315468 A1* | 10/2019 | White ................ B64D 11/0605 |
| 2021/0188441 A1* | 6/2021 | Lee ................... B64D 11/0604 |

FOREIGN PATENT DOCUMENTS

| | | | | |
|---|---|---|---|---|
| FR | 3059951 A1 * | 6/2018 | ......... | B64D 11/0601 |
| WO | WO-2016164524 A1 * | 10/2016 | ......... | B64D 11/0015 |

OTHER PUBLICATIONS

China Patent Application No. 201980063113.7, Office Action and Search Report, dated Apr. 15, 2023, 18 pages.

* cited by examiner

AIRCRAFT CABIN

CROSS-REFERENCE TO RELATED APPLICATIONS

This application claims the benefit of United Kingdom Patent Application No. 1815702.4 filed on Sep. 26, 2018.

FIELD OF THE INVENTION

The present invention concerns an aircraft cabin. More particularly, but not exclusively, this invention concerns an aircraft cabin comprising a first row of seat units extending across the cabin between a first outboard sidewall of the cabin and a second opposite outboard sidewall of the cabin.

BACKGROUND OF THE INVENTION

Airlines are increasingly providing aircraft cabins that incorporate facilities for companion travel into first-class or business-class suites. For example, the "Skyroom" provided by Zodiac Seats UK for Singapore Airlines uses two first class seat units within a column of seat units to create a shared space for companion travel. Furthermore, there are business class seating arrangements that can be configured with shared space for companion travellers using the middle seats of a 1-2-1 configuration, e.g. the "Skylounge" provided by Zodiac Seats France for Emirates. Qatar Airways' "QSuites" (RTM) also allows for companion travel in the middle columns of a 1-2-1 configuration for two travellers and can also be extended for interaction of up to four travellers in two adjacent rows. The "Optima" seats by Zodiac Seats UK are another example of a seating arrangement in which the middle two seats of a 2-4-2 configuration can be converted into a shared space for companion travellers, this arrangement also provides the option of creating a double bed.

There is a desire to provide companion travellers with more shared space. However, space within an aircraft cabin is relatively limited and it is difficult to provide shared space that is usable by companion travellers wishing to enjoy privacy from other travellers during flight.

The present invention seeks to mitigate the above-mentioned problems.

SUMMARY OF THE INVENTION

The present invention provides, according to a first aspect, an aircraft cabin comprising a first row of seat units extending across the cabin between a first outboard sidewall of the cabin and a second opposite outboard sidewall of the cabin, a first aisle extending along the cabin, and a second aisle extending along the cabin, wherein the first row of seats units comprises a first seat unit, a second seat unit, a third seat unit and no further seat units, wherein: the first aisle is positioned adjacent the first outboard sidewall and separates the first outboard sidewall and the first seat unit, the second seat unit is positioned adjacent the first seat unit, and the third seat unit is spaced apart from the second seat unit by the second aisle, the third seat unit being positioned adjacent the second outboard sidewall, and wherein the first row of seat units further comprises a privacy screen movable between a stowed position and a deployed position in which the privacy screen provides a barrier at least partially partitioning the first seat unit and second seat unit.

A row of seat units comprising exactly three seat units provides a generous amount of space to each of the passengers located in those seat units, compared with conventional aircraft cabins which typically have at least four seats in a row. Furthermore, by positioning two neighbouring seat units adjacent to one another in a 0-2-1 arrangement, as opposed to spacing apart the seat units in a 1-1-1 arrangement, it is possible to provide a seating arrangement in which companion travellers located in the neighbouring first and second seat units are able to stow the privacy screen partitioning their seat units. When in the deployed position, the privacy screen acts as a barrier, or wall, between the first and second seat units that to mitigates noise transfer between the first and second seat units. Furthermore, in the deployed position, the privacy screen acts to obscure the view between the first and second seat units, giving the passengers of those seat units a sense of privacy. Moving the privacy screen to the stowed position removes the barrier at least partially partitioning the first seat unit and second seat unit thereby providing access between the two seat units such that passengers in the first and second seat units can see and talk to one another.

The privacy screen may be positioned between the first seat unit and second seat unit in the stowed position. The privacy screen may be positioned between the first seat unit and second seat unit in the deployed position.

The first seat unit may comprise a first primary seat, the second seat unit may comprise a second primary seat, and the third seat unit may comprise a third primary seat wherein each of the first, second, and third primary seats face in a direction substantially parallel with a longitudinal axis of the aircraft cabin. Each primary seat may be convertible to a bed. The first and second primary seats may be positioned together such that, when in the privacy screen is in the stowed position, the first and second primary seats are convertible to a double bed formed by the first and second primary seats. Each of the first, second, and third primary seats may face in a direction substantially parallel with each other.

The first and/or second aisles may extend substantially parallel to the longitudinal axis. The first and second aisles may extend substantially parallel with one another. In embodiments of the invention comprising seats that are rotatably mounted upon a floor of the aircraft cabin, the first, second, and third primary seats may be rotatable to a position in which they face in a direction substantially parallel with a longitudinal axis of the aircraft cabin. The seat units may be configured so that the first, second, and third primary seats face in a direction substantially parallel with a longitudinal axis of the aircraft cabin at least during taxi, take-off, and landing.

Each seat unit may comprise only one primary seat for a single passenger of the seat unit. The seat unit may also comprise a secondary seat, for example for a secondary passenger, facing in a different, preferably opposite (for example, facing the primary seat) direction to the primary seat.

The privacy screen may be at least 1090 millimetres (43 inches) high as measured from the cabin floor when in the deployed position. The privacy screen may be at least 1270 millimetres (50 inches) high, preferably at least 1520 millimetres (60 inches) high as measured from the cabin floor when in the deployed position. The privacy screen may therefore be deployable to a height substantially above the average head position of a passenger sitting in the first or second primary seat.

The privacy screen is movable between the stowed position and the deployed position by being configured to be able to lowered and raised. The privacy screen may be moved to the stowed position by lowering the privacy screen and may be moved to the deployed position by raising the privacy screen. The privacy screen may be lowerable to a position below the first and second primary seats to allow the first and second primary seats to be convertible to a double bed. The privacy screen may be lowerable into an item of furniture positioned between the first and second seat units.

The cabin may comprise furniture positioned between the first and second primary seats configured to provide a shared table surface between the first and second primary seats when the privacy screen is in the stowed position. The furniture may comprise a plinth. The furniture may provide a table surface to at least one of the first and/or second primary seats when the privacy wall is in the deployed position.

At least one of the first, second, or third primary seats may be at least partially enclosed by one or more privacy walls. Two or three of the seat units may comprise a primary seat that is at least partially enclosed by one or more privacy walls. A front privacy wall may be positioned in front of a primary seat and a rear privacy wall may be positioned behind the primary seat such that the primary seat is at least partially enclosed by the front privacy wall and rear privacy wall. A side privacy wall may be positioned between the primary seat and the aisle. The seat unit may comprise a privacy door movable between an open position and a closed position in which the privacy door is positioned between the primary seat and the aisle, thereby at least partially enclosing the primary seat from the aisle.

The privacy walls may be at least 1090 millimetres (43 inches) high as measured from the cabin floor when in the deployed position. Preferably, the privacy walls may be at least 1270 millimetres (50 inches) high or even more preferably, at least 1520 millimetres (60 inches) high as measured from the cabin floor when in the deployed position.

The cabin may comprise a partition movable between a stowed position and a deployed position in which the partition is positioned at least partially in one of the first or second aisles, adjacent at least one of the first, second, and third seat units thereby at least partially blocking the first or second aisle.

In the deployed position, the partition may block the first or second aisle such that a person cannot pass through the first or second aisle without moving the partition from the deployed position. In the deployed position, the partition may be positioned within the aisle such that it completely blocks the aisle. A person may therefore not be able to pass through the aisle space between the second and third seat units, or between the first seat unit and first outboard sidewall, without first removing the partition.

In the deployed position, the partition may be positioned between second and third seat units thereby at least partially blocking the second aisle between second and third seat units. In the deployed position, the partition may be positioned between the first seat unit and the outboard side wall thereby at least partially blocking the first aisle between the first seat unit and the outboard side wall.

A first partition may be movable to a deployed position in the first aisle. A second partition may be moveable to a deployed position in the second aisle. Further partitions may be deployable in the first and/or second aisles. A third partition may be deployable in the first aisle. A fourth partition may be deployable in the second aisle. Two partitions may be deployable at positions spaced apart along the first aisle, adjacent to the first seat unit, to create a private space accessible only to the first seat unit. Two partitions may be deployable at positions spaced apart along the second aisle, adjacent to the second and third seat units, to create a private space accessible only to the second and third seat units. The first row of seats units may be the only row of seat units in the cabin provided with a moveable partition.

The cabin may further comprise a floor and one of the first, second, or third primary seats may be rotatably mounted upon the cabin floor. The first and/or second and/or third primary seats may be rotatable by at least 50 degrees, preferably by at least 70 or 90 degrees. The first and/or second and/or third primary seats may be rotatable by at least 140 degrees, and preferably by at least 160 degrees, or more preferably, by 180 degrees. The first and/or second and/or third primary seats may be rotatable to face away from an aisle and preferably face away from another other primary seat. The first row may run substantially perpendicular to the longitudinal axis and/or aisle. The first and/or second and/or third primary seat may be rotatable between a position in which the primary seat faces a direction substantially parallel to the longitudinal axis and a direction in which the first and/or second and/or third primary seat faces substantially perpendicular to the longitudinal axis.

The first primary seat and the second primary seat may be rotatably mounted upon the cabin floor and rotatable to face to the other primary seat. The second primary seat and the third primary seat may be rotatably mounted upon the cabin floor and rotatable to face to the other primary seat.

The aircraft cabin may comprise a first further seat unit and a second further seat unit, the first further seat unit and second further seat unit being in a second row of seat units, the second row of seat units being positioned adjacent the first row of seat units, the first further seat unit and second further seat unit being separated from each other by the second aisle, each of the second seat unit, third seat unit, first further seat unit, and second further seat unit may comprise a primary seat and a privacy wall positioned between the primary seat and the aisle, the privacy wall being movable between a stowed position and a deployed position in which the primary seat is at least partially enclosed by the privacy wall, wherein the cabin optionally comprises an additional partition movable between a stowed position and a deployed position in which the additional partition is positioned at least partially in the aisle between the first further seat unit and the second further seat unit thereby at least partially blocking the aisle.

Such an arrangement advantageously enables a substantially enclosed private space to be created between the second seat unit, third seat unit, first further seat unit, and second further seat unit that is usable by companion travellers travelling in those seat units. The cabin may comprise further movable partitions and further rows of seat units positioned either side of the second aisle and configured in the same way as the second seat unit, third seat unit, first further seat unit, and second further seat unit so that a shared space can be created between six, eight, and so on, seat units positioned either side of the second aisle.

The aircraft cabin may comprise a piece of furniture deployable into either the first or second aisle. The piece of furniture may be a table. The piece of furniture may be a seat. The piece of furniture may be a display monitor, such as an In-Flight-Entertainment (IFE) screen, a screen connectable to a personal electronic device (PED), or a computer game console screen. The piece of furniture may be a piece of exercise equipment.

The present invention provides, according to a second aspect, kit of parts for installation in an aircraft to provide the aircraft cabin of the first aspect of the invention, the kit of parts comprising a plurality of seat units and privacy screens.

The present invention provides, according to a third aspect, an aircraft comprising the aircraft cabin of the first aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
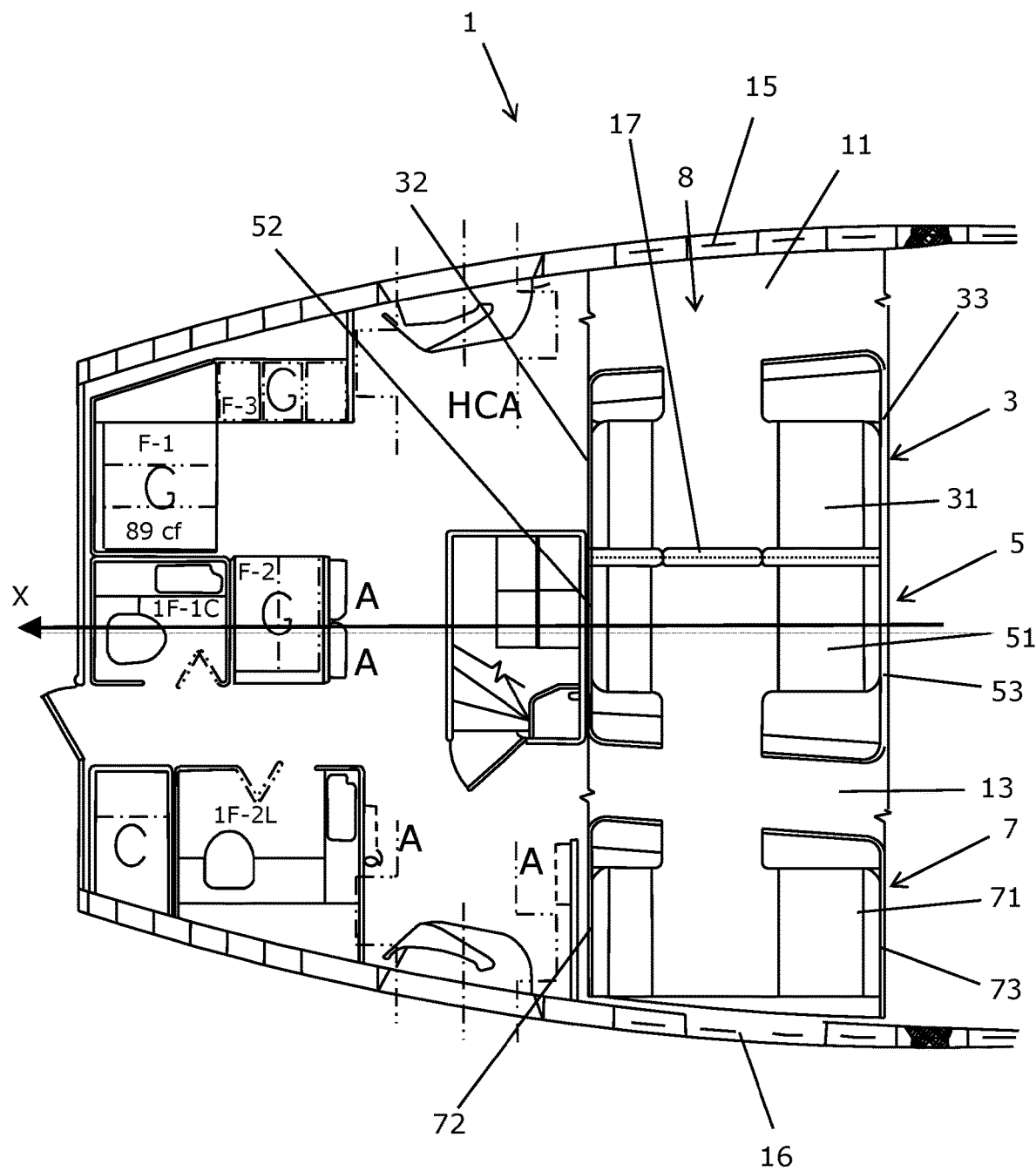
FIG. 1 is a plan view of part of an aircraft cabin according to a first embodiment of the invention.

A plan view of part of an aircraft cabin 1 according to a first embodiment of the invention is shown in FIG. 1. The cabin 1 comprises three seat units 3, 5, 7 arranged in a first row 8 across the cabin, between a first outboard sidewall 15 and a second opposite outboard sidewall 16. A first aisle 11 is positioned adjacent the first outboard side wall 15, the first aisle 11 thereby separating the first outboard side wall 15 and first seat unit 3. A second seat unit 5 is positioned adjacent the first seat unit 3, and a third seat unit 7 is spaced apart from the second seat unit 5 by a second aisle 13, the third seat unit 7 being adjacent the second outboard sidewall 16. The first and second aisles 11, 13 extend along the cabin 1, substantially parallel to the first and second outboard sidewalls 15, 16.

The cabin comprises a longitudinal axis X and each seat unit 3, 5, 7 comprises a seat 31, 51, 71 which faces in a direction parallel (facing forwards—to the left as shown in FIG. 1) with the longitudinal axis and is convertible into a bed. A front privacy wall 32, 52, 72 is located in front of each seat 31, 51, 71 and a rear privacy wall 33, 53, 73 is located behind each seat, the front privacy walls 32, 52, 72 and rear privacy walls 33, 53, 73 extend to a height of 1520 millimetres (60 inches), as measured from the cabin floor, thereby enclosing the seats 31, 51, 71 from the front and the rear.

Figure 2:
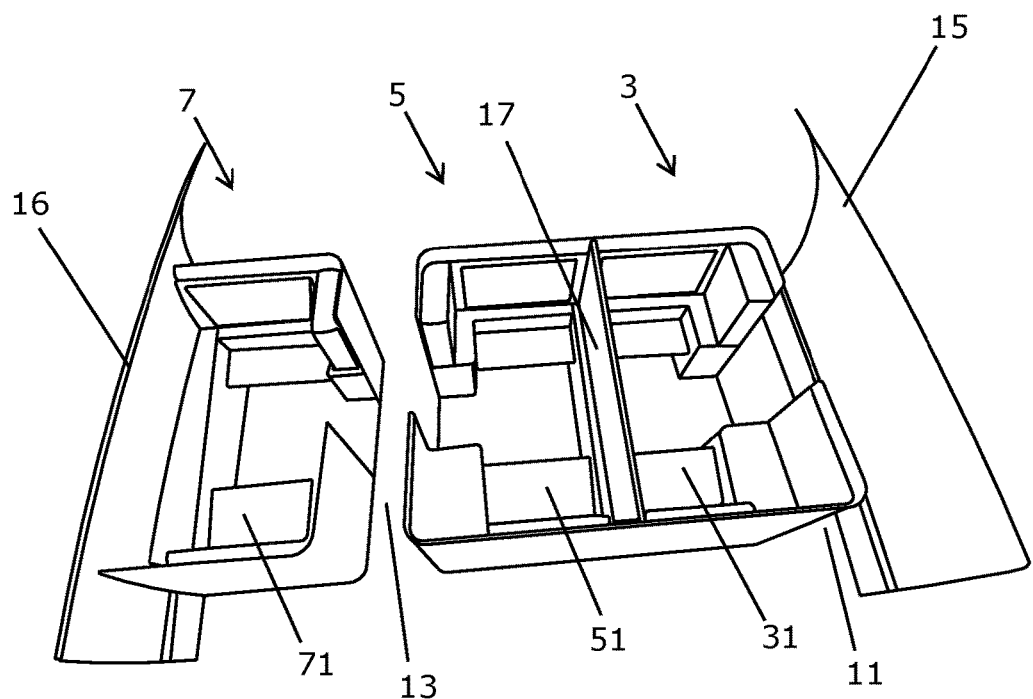
FIG. 2 is an overhead perspective view of the first, second, and third seat units of the aircraft cabin.

The adjacent first and second seat units 3, 5 are separated by a privacy screen 17, shown in more detail in FIG. 2, that is stowable should the passengers located in the first and second seat units 3, 5, be, for example, travelling together and wish to create a shared space between the first and second seat units 3, 5 during flight. The privacy screen 17 is shown as deployed (raised) in FIG. 2 wherein the screen 17 extends to a height of 1520 millimetres (60 inches), as measured from the cabin floor such that the screen 17 acts as barrier between the first and second seat units 3, 5 thereby acting to mitigate noise transfer between the first and second seat units and to ensure that a passenger seated in the seat 31 of the first seat unit 3 cannot see into the second seat unit 5 and vice versa.

Figure 3:
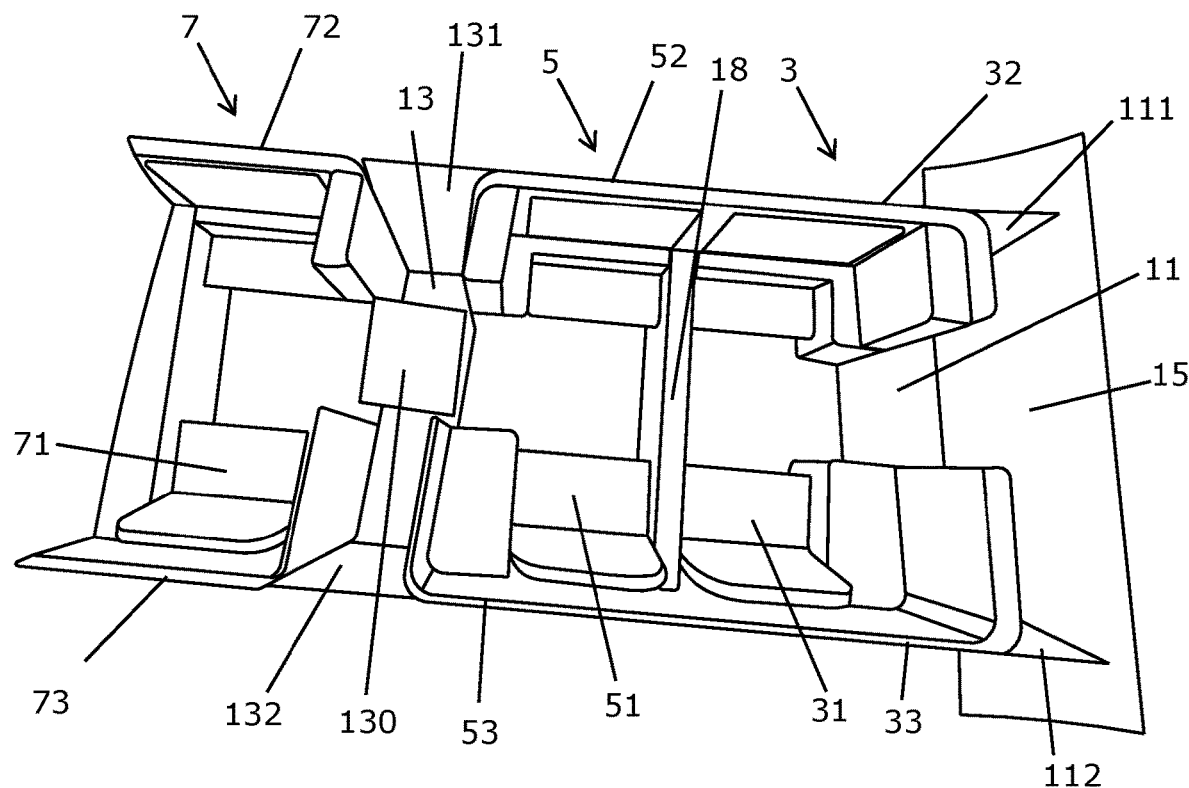
FIG. 3 is an overhead perspective view of the first, second, and third seat units of the aircraft cabin wherein partitions have been deployed into the first and second aisles.

The privacy screen 17 is shown as stowed (lowered) in FIG. 3. As can been seen, a plinth 18 comprising a recess into which the privacy screen 17 can be lowered is positioned between the first and second seat units 3, 5 so that a shared space can be created between the first and second seat units 3, 5 by stowing the privacy screen 17 within the plinth 18.

During boarding of the aircraft, for example, access through the first aisle 11 and second aisle 13 is needed for the aircraft crew and passengers. However, when such access is not required, for example during flight, it is possible to block the first aisle 11 between the first seat unit 3 and the outboard side wall 15 and the second aisle 13 between the second seat unit 5 and third seat unit 7 to convert the aisles 11, 13 into private spaces that are shared between the seats unit(s) either side of the aisles 11, 13.

As can be seen in more detail in FIG. 3, a slideable partition 131 is movable to a deployed position in which it is positioned adjacent the front privacy walls 52, 72 of the second and third seat units 5, 7 to fully block the second aisle 13 at a front region of the seat units 5, 7. There is also a further slideable partition 132 movable to a deployed position in which it is positioned adjacent the rear privacy walls 53, 73 of the second and third seat units 5, 7 to fully block the second aisle 13 at a rear region of the seat units 5, 7.

Deploying the partitions 131, 132 creates a substantially enclosed private space that is shared between the second and third seat units 5, 7. In this configuration, a table 130 can also be deployed into the second aisle, between the second and third seat units 5, 7, as shown in FIG. 3, so that passengers in the second and third seat units 5, 7 can share the table 130 to, for example, dine or work together.

Similarly, in the first aisle 11 a slideable partition 111 is movable to a deployed position in which it is positioned adjacent the front privacy wall 32 of the first seat unit 3 to fully block the first aisle 11 between the first seat unit 3 and the outboard side wall 15 at a front region of the seat unit 3. A further slideable partition 112 is movable to a deployed position in which it is positioned adjacent the rear privacy wall 33 of the first seat unit 3 to fully block the first aisle 11 between the first seat unit 3 and the outboard side wall 15 at a rear region of the seat unit 3.

Deploying the partitions 111, 112 creates a substantially enclosed private space, including space in the first aisle 11, that is accessible only to the first seat unit 3.

Figure 4:
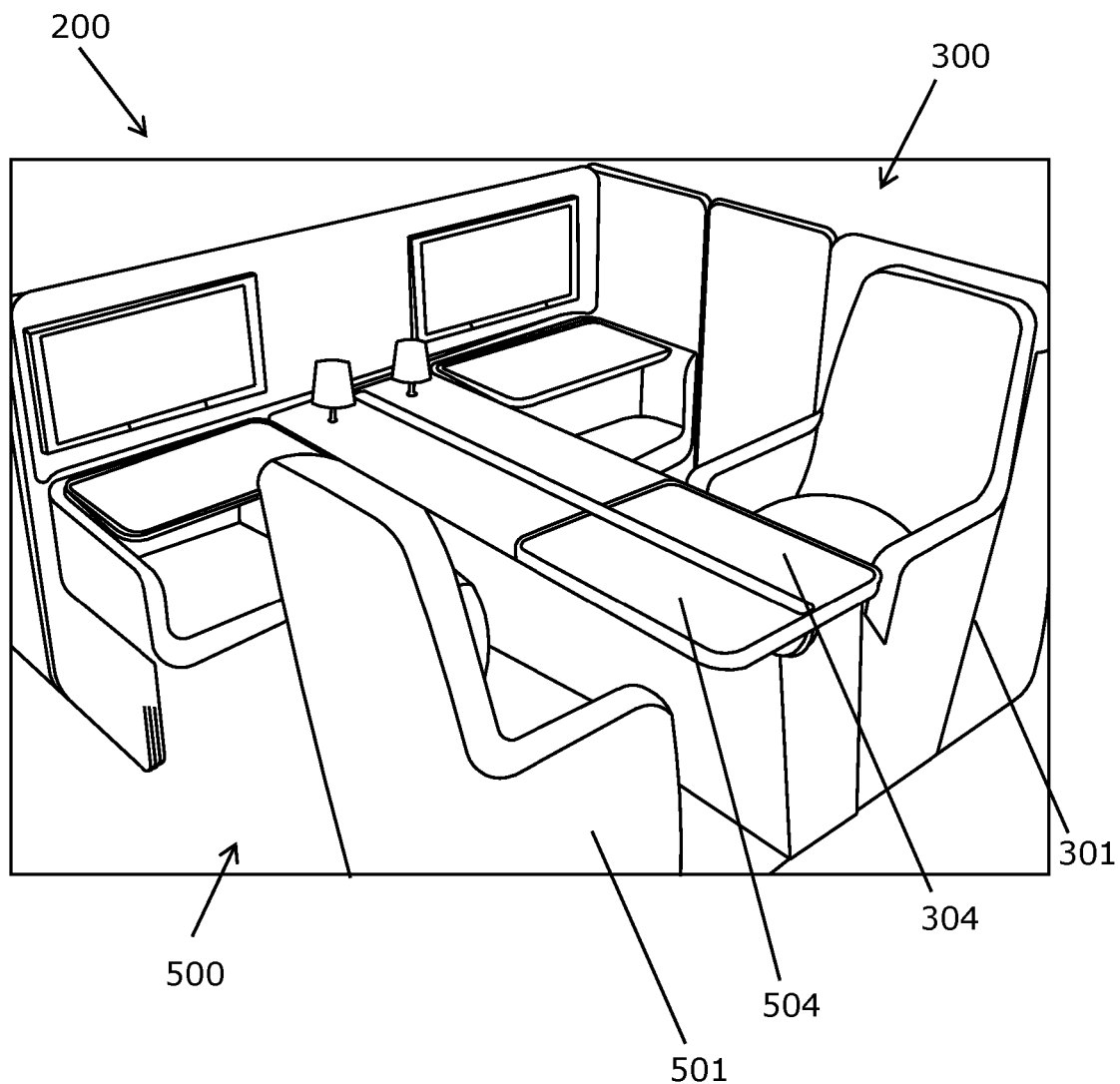
FIG. 4 is a perspective view of first and second seat units of part of an aircraft cabin according to a second embodiment of the invention.

A first seat unit 300 and a second seat unit 500 belonging to an aircraft cabin 200 according to a second embodiment of the invention is shown in FIG. 4. The seats 301, 501, belonging to the first and second seat units 300, 500 are rotatably mounted upon the cabin floor and are rotatable through 90 degrees to a position in which they face one another. During taxi, take-off, and landing (TTL), the seats can be rotated to a TTL position in which the seats face forward, substantially in the direction of travel of the aircraft. However, during flight the privacy screen can be stowed as shown in FIG. 4 so that the passengers sat in the first and second seats 301, 501 can rotate their seats 301, 501 to face one another so that they can, for example, dine or work together at a shared table surface that is formed by tables 304, 504 belonging to each seat unit 300, 500.

Figure 5:
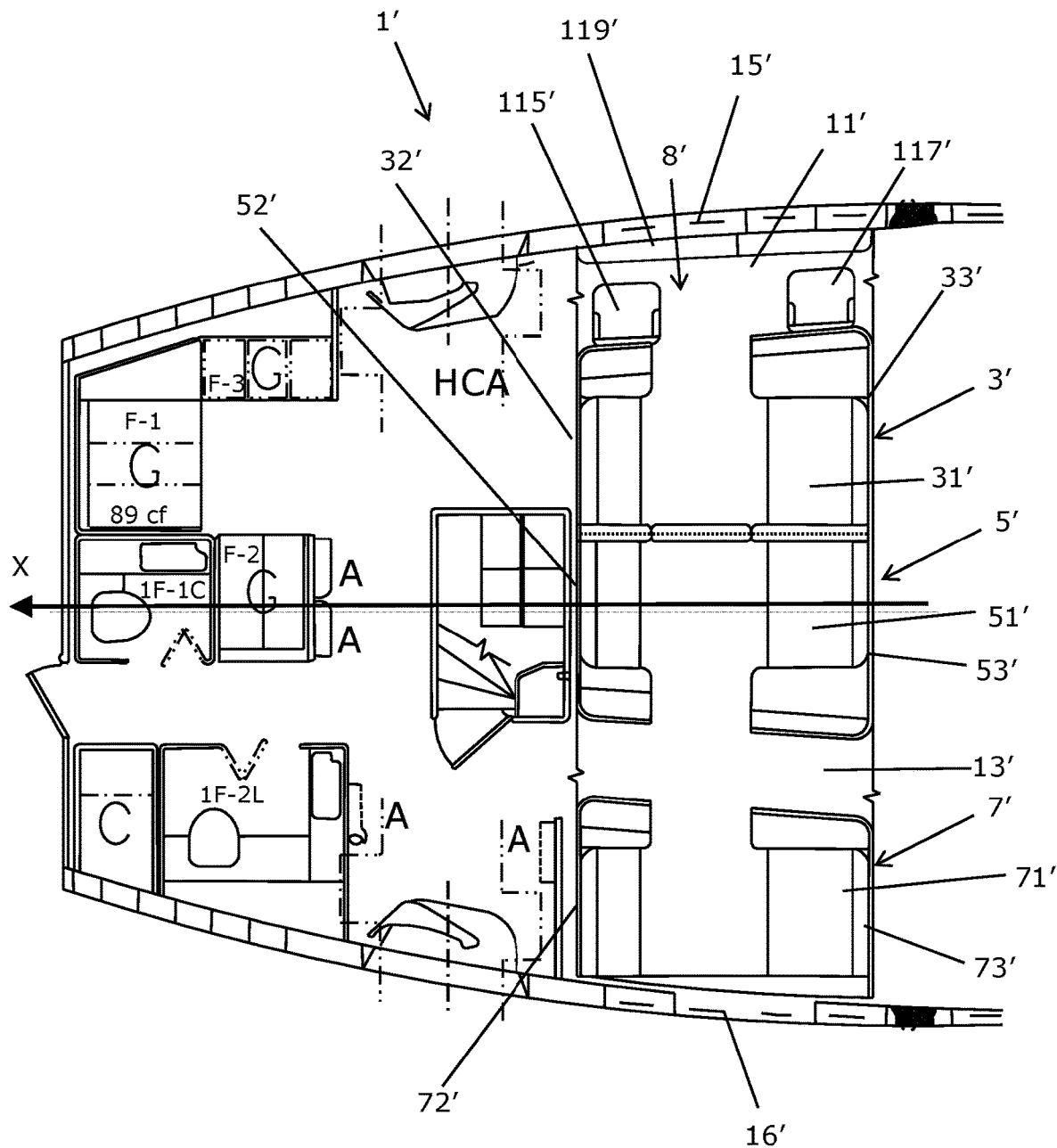
FIG. 5 is a plan view of part of an aircraft cabin according to a third embodiment of the invention.

A part of an aircraft cabin 1' according to third embodiment of the invention is shown in FIG. 5. The aircraft cabin 1' is substantially the same as the aircraft cabin 1 according to the first embodiment of the invention. Features of the aircraft cabin 1' of the third embodiment of the invention that are also present the aircraft cabin 1 of the first embodiment of the invention have been labelled in FIG. 5 using the same reference numeral as used in FIG. 1 but appended with '. In addition to the features of the aircraft cabin 1 according to the first embodiment of the invention, the aircraft cabin 1' of the third embodiment of the invention also comprises a first aisle seat 115' and a second aisle seat 117' that are deployable, from a stowed position, into the first aisle 11. During taxi, take-off, and landing, the aisle seats 115', 117' can be stowed within the aircraft cabin 1'. However, during flight the aisle seats 115', 117' can be deployed within the first aisle 11' as shown in FIG. 5 so that, for example, a passenger of the first seat unit 3' and a companion traveller can sit-side-by-side with in the aisle seats 115', 117'. Furthermore, the aircraft cabin 1' also comprises a table surface 119' mounted upon the outboard sidewall 15' that projects into the first aisle 11' and is usable by passengers seated in either of the aisle seats 115', 117' so that passengers seated in the aisle seats 115', 117' can, for example, dine or work together at the table surface 119'.

Figure 6:
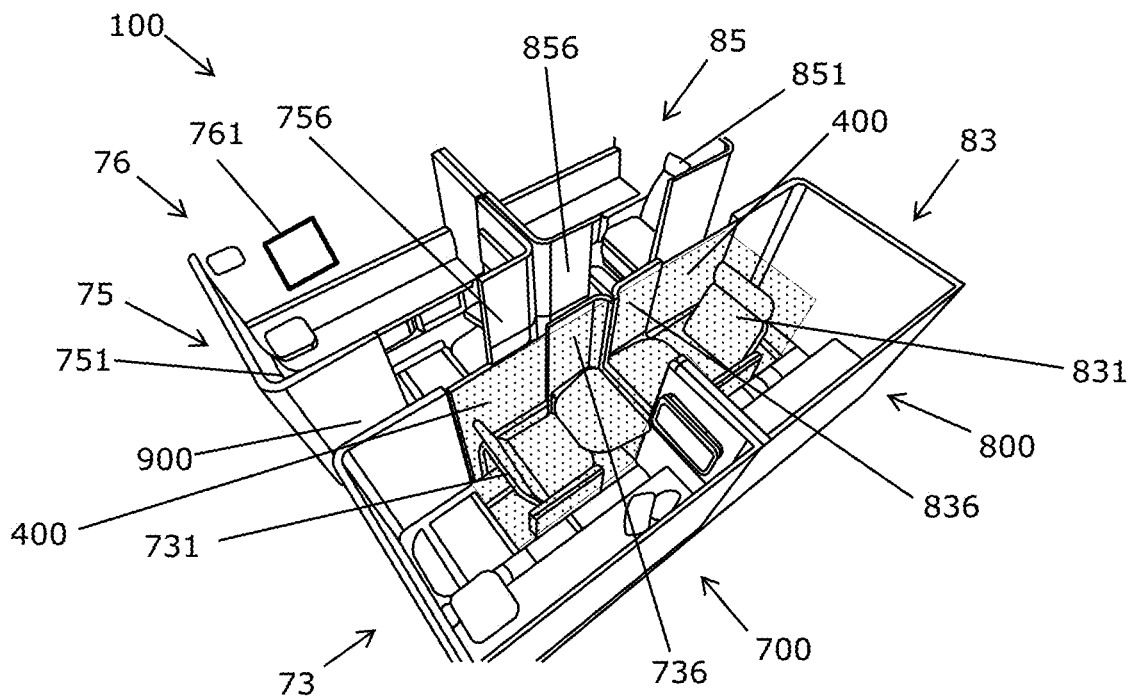
FIG. 6 is an overhead perspective view of part of an aircraft cabin according to a fourth embodiment of the invention, shown with seat unit privacy walls in a deployed position.
Figure 7:
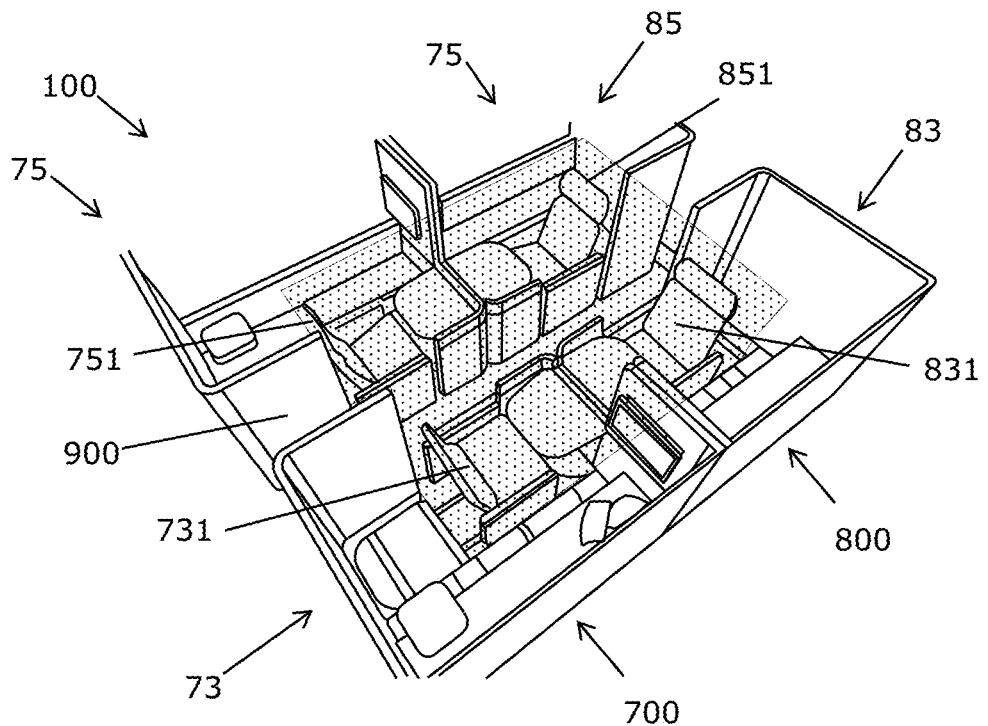
FIG. 7 is an overhead perspective view of the part of the aircraft cabin shown in FIG. 6, with the seat unit privacy walls in a stowed position.

A part of an aircraft cabin 100 according to fourth embodiment of the invention is shown in FIGS. 6 and 7. The aircraft cabin 100 includes a first row of seats 700 comprising a first seat unit 74, a second seat unit 75, and a third seat unit 73. The second seat unit 75 and third seat unit 73 are separated by an aisle 900. The cabin 100 also comprises a fourth seat unit 83 and a fifth seat unit 85 separated by the aisle 900 in a second row 800 of seat units. The second, third, fourth, and fifth seat units 75, 73, 85, 83 each comprise a seat 751, 731, 851, 831 and a privacy wall 756, 736, 856, 836 positioned between the seat 751, 731, 851, 831 and the aisle 900 to enclose the seat 751, 731, 851, 831 and acting as a barrier between the seat 751, 731, 851, 831 and the aisle 900. Each seat unit 75, 73, 85, 83 may comprise a privacy door 400 movable between an open position and a closed position in which the privacy door 400 is positioned between the seat 751, 731, 851, 831 and the aisle 900, thereby at least partially enclosing the seat 751, 731, 851, 831 from the aisle 900.

Each of the privacy walls 736, 756, 836, 856 is shown in a deployed position in FIG. 6 in which the seats 751, 731, 851, 831 are enclosed by the privacy walls 756, 736, 856, 836. However, the privacy walls 756, 736, 856, 836 are each movable to a stowed position, as shown in FIG. 7, in which the privacy walls 736, 756, 836, 856 are lowerable to a position in which they no longer enclose the seats 731, 751, 831, 851, thereby removing the barrier between the seats 731, 751, 831, 851 and the aisle 900. As can be seen in FIG. 7, when the privacy walls 736, 756, 836, 856 are lowered, a shared space can be created in the aisle 900 between the first, second, third, and fourth seat units 73, 75, 83, 85. Furthermore, partitions (not shown) are moveable to deployed positions across the aisle 900, in substantially the same way as described with respect to the slidable partitions 111, 112, 131, 132 of the first embodiment of the invention, so that a substantially enclosed private space, including space in aisle 900, is shared between passengers sat in the seats 731, 751, 831, 851 of the first second, third and fourth seat units 73, 75, 83, 85.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In some embodiments of the invention there may be no plinth or other furniture positioned between the first and second seat units and the privacy screen may be lowerable to a level below the first and second seats so that the first and second seats are convertible into a double bed. Alternatively, in some embodiments of the invention there may be a plinth positioned between the first and second seat units wherein the plinth is lower than the first and second seats so that the privacy screen may be lowerable into the plinth below the first and second seats to enable the first and second seats to be converted into a double bed.

The partitions 111, 112, 131, 132 are configured to slide into place to block the first and second aisles 11, 13. However, in other embodiments of the invention the partitions may be hinged, or alternatively, may be completely detachable and stowed within, for example, a compartment somewhere within the aircraft cabin. Alternatively, the partitions could be curtains.

In another embodiment of the invention, similar to the second embodiment of the invention, a third seat unit positioned adjacent a sidewall of the cabin is spaced apart from a second seat unit by an aisle. A third seat belonging to the third seat unit is rotatably mounted upon the cabin floor and is rotatable through 90 degrees to a position in which the seat faces the adjacent sidewall of the cabin. During taxi, take-off, and landing (TTL), the third seat is rotatable to a TTL position in which it faces forward, substantially in the direction of travel of the aircraft. However, during flight the third seat can be rotated to face the sidewall. In this position a passenger seated in the third seat may be able to use a table surface positioned between the third seat and sidewall for, for example, dining or working.

Some embodiments of the invention may comprise seat(s) rotatable through 180 degrees so that a seat can rotate, from a forward facing position, 90 degrees in a first direction or 90 degrees in a second, opposite direction. Such an arrangement may therefore enable a seat to face into an aisle on a first side of the seat or to face a neighbouring seat unit or sidewall on a second side of the seat. Neighbouring seats may therefore be rotatable to face away from one another as well as towards one another.

In addition, or alternatively, to a table 130 deployable into the first aisle, as shown in FIG. 3, some embodiments of the invention may comprise other items of furniture deployable either one of, or both of, the first and second aisles. The item(s) of furniture may include a table, a further seat, a piece of exercise equipment, and/or a display monitor, such as an In-Flight-Entertainment (IFE) screen, a screen connectable to a personal electronic device (PED), or a computer game console screen.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft cabin comprising:
    a first row of seat units extending across the cabin between a first outboard sidewall of the cabin and a second opposite outboard sidewall of the cabin, the first row of seat units comprising a first seat unit, a second seat unit, a third seat unit, and no additional seat units,
    a second row of seat units positioned adjacent the first row of seat units, the second row of seat units comprising a fourth seat unit and a fifth seat unit,
    a first aisle extending along the cabin, and
    a second aisle extending along the cabin,
    wherein:
        the first aisle adjoins the first outboard sidewall of the cabin and extends substantially parallel to a longitudinal axis of the cabin along the first outboard sidewall, thereby separating the first outboard sidewall and the first seat unit,
        the second aisle extends substantially parallel to the longitudinal axis of the cabin between the second seat unit and the third seat unit of the first row of seat units and between the fourth seat unit and the fifth seat unit of the second row of seat units,
        in the first row of seat units the first seat unit adjoins the second seat unit and
        the third seat unit adjoins the second outboard sidewall,
        the first row of seat units further comprises a privacy screen movable between a stowed position and a deployed position in which the privacy screen provides a barrier at least partially partitioning the first seat unit and second seat unit, and
        each of the second seat unit, third seat unit, fourth seat unit, and fifth seat unit comprises a seat and a privacy wall positioned to one side of an entrance to the seat unit, between the seat of the seat unit and the second aisle, the privacy wall being movable between a stowed position and a deployed position in which the privacy wall is positioned to the one side of the entrance to the seat unit such that the seat of the seat unit is enclosed by the privacy wall.

2. The aircraft cabin according to claim 1, wherein the first seat unit comprises a seat, and wherein the seats of each of the first seat unit, the second seat unit, and the third seat unit face in a direction substantially parallel with the longitudinal axis of the aircraft cabin.

3. The aircraft cabin according to claim 2, wherein each seat unit comprises only one seat for a single passenger of the seat unit.

4. The aircraft cabin according to claim 1, wherein the privacy screen is at least 1090 millimetres (43 inches) high as measured from the cabin floor when in the deployed position.

5. The aircraft cabin according to claim 1, wherein the privacy screen is movable between the stowed position and the deployed position by being configured to be able to lowered and raised.

6. The aircraft cabin according to claim 1, wherein the first seat unit comprises a seat and a table, the second seat unit comprises an additional table, wherein the table and the additional table are positioned between the seats of the first seat unit and the second seat unit, and the table and the additional table are configured to provide a shared table surface between the seats of the first and second seat units when the privacy screen is in the stowed position.

7. The aircraft cabin according to claim 1, wherein the cabin comprises a partition movable between a stowed position and a deployed position in which the partition is positioned at least partially in one of the first or second aisles, adjacent at least one of the first, second, and third seat units thereby at least partially blocking the first or second aisle.

8. The aircraft cabin according to claim 7, wherein, in the deployed position, the partition blocks the first or second aisle such that a person cannot pass through the first or second aisle without moving the partition from the deployed position.

9. The aircraft cabin according to claim 7, wherein, in the deployed position, the partition is positioned between the second and third seat units thereby at least partially blocking the second aisle between second and third seat units.

10. The aircraft cabin according to claim 7, wherein, in the deployed position, the partition is positioned between the first seat unit and the outboard side wall thereby at least partially blocking the first aisle between the first seat unit and the outboard side wall.

11. The aircraft cabin according to claim 7, wherein the first row of seat units is the only row of seat units in the cabin provided with a partition movable between a stowed position and a deployed position in which the partition is positioned at least partially in one of the first or second aisles.

12. The aircraft cabin according to claim 1, wherein the first seat unit comprises a seat and one of the seats of the first seat unit, second seat unit, or third seat unit is rotatably mounted upon a floor of the cabin.

13. The aircraft cabin according to claim 12, wherein the seats of the first seat unit and second seat unit are rotatably mounted upon the floor of the cabin and are rotatable to face each other.

14. The aircraft cabin according to claim 12, wherein the seats of the second seat unit and third seat unit are rotatably mounted upon the floor of the cabin and are rotatable to face each other.

15. The aircraft cabin according to claim 1, comprising a piece of furniture deployable into either the first or second aisle.

16. The aircraft cabin according to claim 15, wherein the piece of furniture is a table, an additional seat, a display monitor or a piece of exercise equipment.

17. A kit of parts for installation in an aircraft to provide the aircraft cabin of claim 1, the kit of parts comprising a first, second, third, fourth, and a fifth seat unit, and a privacy screen,
    wherein the first, second, and third seat unit are configured to be arranged into a first row of seat units and the privacy screen is configured to be placed between the first and second seat units such that the privacy screen is movable between a stowed position and a deployed position in which the privacy screen provides a barrier at least partially partitioning the first seat unit and second seat unit,
    wherein the fourth and fifth seat units are configured to be arranged into a second row of seat units positioned adjacent the first row of seat units, and
    wherein each of the second, third, fourth and, fifth seat units comprises a seat and a privacy wall, wherein the privacy wall is configured to be positioned to one side of an entrance to the seat unit, between the seat of the seat unit and an aisle of the aircraft cabin, and wherein the privacy wall is further configured to be movable between a stowed position and a deployed position in which the privacy wall is positioned to the one side of the entrance to the seat unit such that the seat of the seat unit is enclosed by the privacy wall.

18. An aircraft comprising the aircraft cabin of claim 1.

19. The aircraft cabin according to claim 1, wherein each of the second seat unit, third seat unit, fourth seat unit, and fifth seat unit comprises a privacy door movable between an open position and a closed position in which the privacy door is positioned across the entrance to the seat unit, between the seat and the aisle, to thereby at least partially enclose the seat of the seat unit from the aisle.

* * * * *